(12) United States Patent
Chowdhury (10) Patent No.: US 9,363,103 B2
(45) Date of Patent: Jun. 7, 2016

(54) ENERGY-MANAGEMENT IN A USER-PREMISES AREA NETWORK

(75) Inventor: Aref Chowdhury, Berkeley Heights, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 901 days.

(21) Appl. No.: 13/531,019

(22) Filed: Jun. 22, 2012

(65) Prior Publication Data

US 2013/0344875 A1    Dec. 26, 2013

(51) Int. Cl.
*H04W 52/02* (2009.01)
*H04L 12/54* (2013.01)
*H04W 40/00* (2009.01)

(52) U.S. Cl.
CPC ........... *H04L 12/5692* (2013.01); *H04W 52/02* (2013.01); *H04W 40/00* (2013.01)

(58) Field of Classification Search
CPC .................................................. H04W 52/02
USPC ................................. 455/445, 411, 466, 455
See application file for complete search history.

(56) References Cited

U.S. PATENT DOCUMENTS

| 7,564,839 B1* | 7/2009 | Kung et al. | 370/352 |
| 7,746,884 B2* | 6/2010 | Van Vleck et al. | 370/419 |
| 8,219,026 B2* | 7/2012 | Naik et al. | 455/41.2 |
| 8,239,073 B2* | 8/2012 | Fausak et al. | 700/295 |
| 2006/0025111 A1* | 2/2006 | Karaoguz et al. | 455/411 |
| 2009/0310600 A1* | 12/2009 | Kung et al. | 370/352 |

OTHER PUBLICATIONS

Huq, Zahurul, et al., "Home Area Network Technology Assessment for Demand Response in Smart Grid Environment," 2010 20th Australasian Universities Power Engineering Conference (AUPEC), Dec. 2010 (pp. 6).
"Home Energy Management—Beyond the Numbers," Aricent Group. 2011 (16 pages).
"Home Area Networks and the Smart Grid," 2011, [Retrieved from: www.hsdl.org]. Retrieved from the Internet: <URL: http://www.hsdl.org/?view&did=700977> (18 pages).
Xiong, Gang, et al., "Smart (In-home) Power Scheduling for Demand Response on the Smart Grid," 2011 IEEE PES Innovative Smart Grid Technologies (ISGT), Jan. 2011, pp. 1-7.

(Continued)

*Primary Examiner* — Michael T Vu
(74) *Attorney, Agent, or Firm* — Mendelsohn Dunleavy, P.C.; Yuri Gruzdkov (57) ABSTRACT

An energy-management system for controlling energy consumption in a relatively small network of energy-consuming/generating objects connected to an electricity grid and located, e.g., at a user premises. The energy consumption is managed through a programmable gateway device that can be accessed remotely, e.g., through a smart-meter network of the utility company or through a short-range wireless link. A user interface for the remote access can be implemented, e.g., using a smart phone or a tablet. In operation, the gateway device advantageously provides the user and/or the utility company with numerous opportunities for realizing cost and/or energy savings through appropriate and timely response to various actionable conditions, such as price-of-electricity fluctuations, configuration-modification requests, failure notices, service requirements, hazard signals, etc.

21 Claims, 3 Drawing Sheets

(56) References Cited

OTHER PUBLICATIONS

"Networked Smart Gateways for Energy Management and Control," 2012, [Retrieved from: www.freescale.com]. Retrieved from the Internet: <URL: www.freescale.com/files/32bit/doc/.../PWRARBYNDBITSNSG.pdf> (5 pages).

"Smart Energy Solutions for Home Area Networks and Grid-End Applications," 2012, [Retrieved from: www.freescale.com]. Retrieved from the Internet: <URL: www.freescale.com/files/32bit/doc/.../PWRARBYNDBITSSES.pdf> (7 pages).

"European Smart Grids Technology Platform," 2006, [Retrieved from: ec.europa.eu]. Retrieved from the Internet: <URL: ec.europa.eu/research/energy/pdf/smartgrids_en.pdf> (44 pages).

"Technology Roadmap: Smart Grids," 2011, [Retrieved from: www.oecd-ilibrary.org]. Retrieved from the Internet: <URL: http://www.oecd-ilibrary.org/energy/technology-roadmap-smart-grids_9789264115071-en> (52 pages).

"A Survey on Smart Home Networking," 2009, [Retrieved from: citeseerx.ist.psu.edu]. Retrieved from the Internet: <URL: kunz-pc.sce.carleton.ca/thesis/SmartHomeNetworking.pdf> (62 pages).

Jin, Cheng, et al., "Design and Implementation of a Smart Home Networking Simulation," Technical Report SCE-10-08, Carleton University, Aug. 2010 (116 pages).

"The Home Area Network: Architectural Considerations for Rapid Innovation," 2010, [Retrieved from: www.usnap.org]. Retrieved from the Internet: <URL: www.usnap.org/UserFiles/HAN_white-paper.pdf> (8 pages).

"Vision of Smart Home The Role of Mobile in the Home of the Future," 2011, [Retrieved from: www.gsma.com]. Retrieved from the Internet: <URL: www.gsma.com/go/download/?file...pdf> (23 pages).

\* cited by examiner

ENERGY-MANAGEMENT IN A USER-PREMISES AREA NETWORK

BACKGROUND

1. Field of the Invention

The present invention relates generally to smart-grid technology and, more specifically but not exclusively, to energy-management systems for user-premises area networks.

2. Description of the Related Art

This section introduces aspects that may help facilitate a better understanding of the invention(s). Accordingly, the statements of this section are to be read in this light and are not to be understood as admissions about what is in the prior art or what is not in the prior art.

The term "smart grid" typically refers to a class of technology that is being deployed to bring electricity-delivery systems up to $21^{st}$-century standards, e.g., using computer- and/or digital-processor-based control and automation. Steady advances in digital communications and signal processing have spurred the development of smart-grid systems by making the corresponding system-enabling components relatively inexpensive and readily available to smart-grid developers. Advantageously, smart-grid systems may offer numerous benefits to utility companies and consumers, e.g., as manifested by big improvements in energy efficiency on the electricity grid and in the end-users' homes and offices.

A home area network (HAN) extends at least some of the smart-grid capabilities into the user premises. In a representative implementation, a home area network is a dedicated local network that connects various energy-consuming, energy-generating, and energy-storing objects located at the user premises in a manner that enables the end-user to realize energy/cost savings through automation and the ability to monitor, control, and/or adapt the operation of these objects to changing energy conditions. Exemplary objects that may be included in a home area network are thermostats, appliances, water and area heaters, lighting, electric-vehicle charging stations, pool pumps, uninterruptable power supplies, communication equipment, multimedia and security systems, renewable-energy generators, electricity-storage equipment, and load-control devices. Various operating methods and the corresponding enabling system components that can be used to take advantage of the full range of HAN capabilities are currently being actively developed.

SUMMARY

Disclosed herein are various embodiments of an energy-management system for controlling energy consumption in a relatively small network of energy-consuming/generating objects connected to an electricity grid and located, e.g., at a user premises. The energy consumption is managed through a programmable energy gateway device that can be accessed remotely, e.g., through a smart-meter network of the utility company or through a short-range wireless link. A user interface for the remote access can be implemented, e.g., using a smart phone or a tablet. In operation, the energy gateway device advantageously provides the user and/or the utility company with numerous opportunities for realizing cost and/or energy savings through appropriate and timely response to various actionable conditions, such as activation/deactivation requests, price-of-electricity fluctuations, configuration-modification requests, failure notices, service requirements, hazard signals, etc.

According to one embodiment, provided is an apparatus comprising a first device configured to control energy consumption in a user-premises area network having a gateway device coupled between a telephone interface and a communication-services provider. The first device is configured to: receive, from the communication-services provider, via a first communication path that does not include the gateway device, an alert about an incoming call to said telephone interface; and cause, in response to the alert, the gateway device to turn ON to enable said telephone interface to receive the incoming call.

In some embodiments of the above apparatus, the apparatus further comprises the gateway device, wherein the gateway device is further configured to provide, via the communication-services provider, at least one of a TV service and an Internet-access service for the user-premises area network.

In some embodiments of any of the above apparatus, the first device is connectable, via a wireless link, to a mobile user device; and the first communication path includes the wireless link and the mobile user device.

In some embodiments of any of the above apparatus, the wireless link is configured to operate in accordance with a Bluetooth standard.

In some embodiments of any of the above apparatus, the first device is configured to communicate with the communication-services provider via at least two different routes that do not include the gateway device, wherein: the first device is connectable, via a wireless link, to a mobile user device; a first of said at least two different routes includes a path through an access network of a utility company that operates an electricity grid connected to the user-premises area network; a second of said at least two different routes includes the wireless link and the mobile user device; and the first communication path is a selected one of the first and second of said at least two different routes.

In some embodiments of any of the above apparatus, the first device is configured to receive said alert via the first communication path when the gateway device is turned OFF or is in a sleep mode.

In some embodiments of any of the above apparatus, the first device is configured to receive the alert via the first communication path that includes a path through an access network of a utility company that operates an external electricity grid connected to the user-premises area network.

In some embodiments of any of the above apparatus, the first device is configured to control said energy consumption in the user-premises area network based on received instructions, wherein at least one of the received instructions originates at a mobile user device configurable to access the first device via said access network.

In some embodiments of any of the above apparatus, the mobile user device is a smart wireless phone configured to run an application for accessing the first device via the access network.

In some embodiments of any of the above apparatus, the first device is configured to control said energy consumption based on received instructions, wherein at least one of the received instructions originates from the utility company.

In some embodiments of any of the above apparatus, the first device is configured to: send a first notification message to a mobile user device in response to an actionable condition detected in the user-premises area network; and send a second notification message to the utility company in response to said actionable condition, wherein the actionable condition belongs to a set consisting of: (i) a failure condition; (ii) a service requirement; (iii) a hazard signal; (iv) a schedule-modification requirement; and (v) a configuration-modification requirement.

In some embodiments of any of the above apparatus, the first device is configured to turn OFF the gateway device when one or more communication services provided via the gateway device have not been requested for a specified length of time or based on a user instruction.

In some embodiments of any of the above apparatus, the first device is further configured to notify the communication-services provider when the communication-services gateway is to be turned OFF.

In some embodiments of any of the above apparatus, the user-premises area network comprises one or more power-sink objects; and the first device is configured to individually control activation and deactivation of at least some of said one or more power-sink objects.

In some embodiments of any of the above apparatus, the first device is configured to individually control said activation and deactivation based on at least one of: (i) an electricity-pricing signal received from a utility company and (ii) a user instruction.

In some embodiments of any of the above apparatus, the first device is configured to: query power-generating equipment and energy storage about the availability of electrical power stored or generated at the user-premises area network; and based on a response to the query, route electrical power from the power-generating equipment and the energy-storage system to the one or more power-sink objects.

In some embodiments of any of the above apparatus, the apparatus includes the user-premises area network, wherein the user-premises area network comprises one or more of: a lighting system, one or more appliances, a heating system, a ventilation system, an air-conditioning system, an electric-vehicle charging system, communication equipment, multimedia equipment, a solar panel, a wind turbine, an energy storage, and a power-routing infrastructure.

According to another embodiment, provided is an apparatus comprising equipment for a communication-services provider configured to provide a telephone service for a telephone line served by said equipment through a gateway device, said gateway device being a component of a user-premises area network that comprises an first device adapted to control energy consumption in said user-premises area network, wherein said equipment is configured to: receive, from the first device, a notification when the gateway device is to be turned OFF; and send, to the first device, via a first communication path that does not include the gateway device, an alert about an incoming call for said telephone line to cause the gateway device to be turned ON and enable said telephone line to receive the incoming call via the gateway device.

In some embodiments of the above apparatus, the first communication path includes a path through an access network of a utility company that operates an external electricity grid connected to the user-premises area network.

In some embodiments of any of the above apparatus, the first communication path includes a mobile user device and a wireless link between the mobile user device and the user-premises area network.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
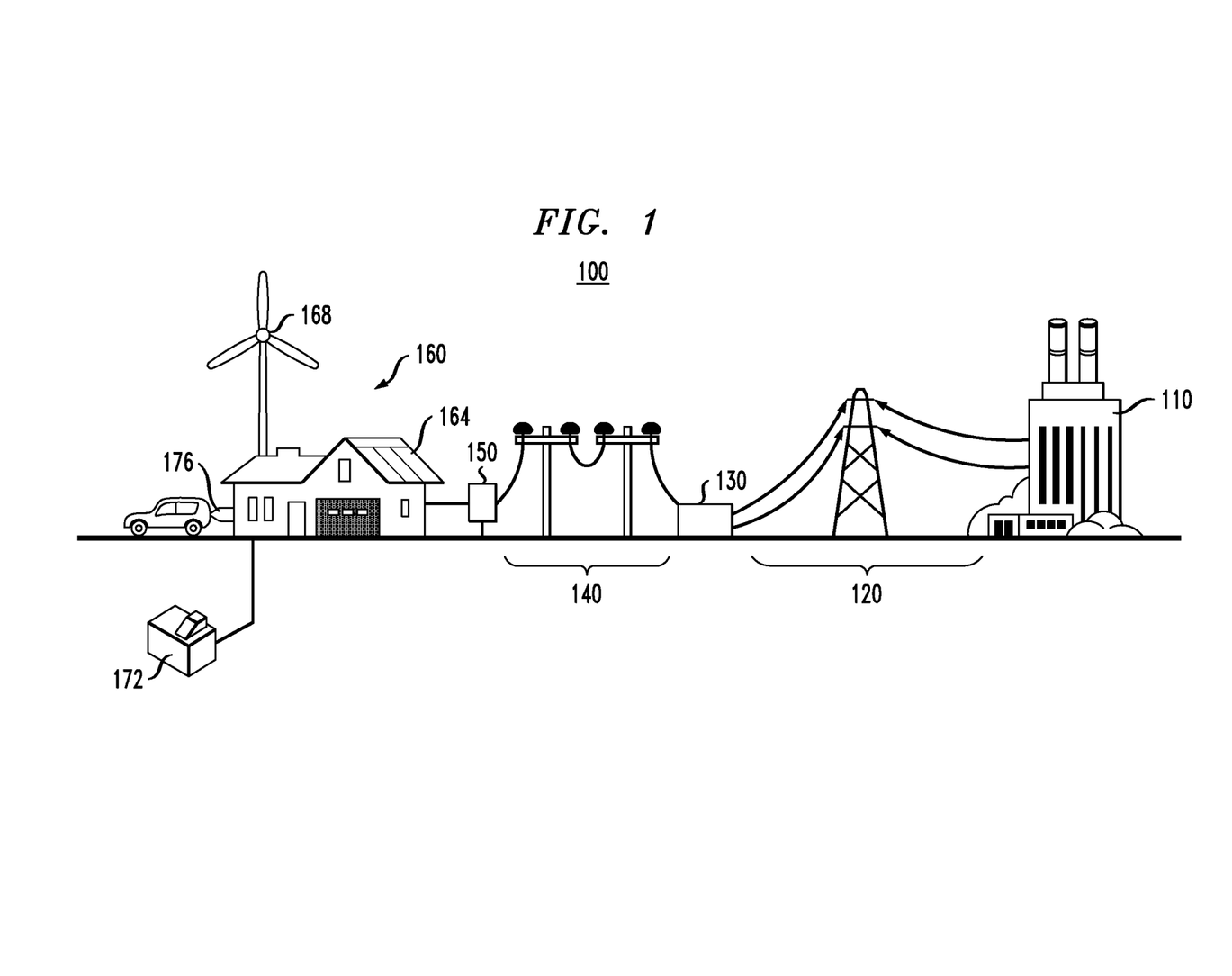
FIG. 1 shows a power-supply system in which various embodiments disclosed herein can be practiced.

FIG. 1 shows a power-supply system 100 in which various embodiments disclosed herein can be practiced. System 100 has a power plant 110 that generates electricity using an available energy source, such as nuclear or fossil fuels, hydro power, wind, solar radiation, etc. Power plant 110 generates electricity at a certain voltage, which depends on the underlying energy source and the utilized energy-conversion technology. Power plant 110 then uses electrical transformers (not explicitly shown in FIG. 1) to step up the generated voltage to a relatively high voltage, e.g., 500 kV, to increase the efficiency of power transmission over an output transmission line 120. In a representative embodiment, transmission line 120 may extend over a relatively large distance, e.g., tens or even hundreds of miles, and include one or more transmission substations (not explicitly shown in FIG. 1). Transmission line 120 typically feeds one or more distribution substations, such as a distribution substation 130 shown in FIG. 1.

Distribution substation 130 operates to transfer power from transmission line 120 to multiple distribution lines, such as a distribution line 140 shown in FIG. 1. The voltage applied by distribution substation 130 to distribution line 140 is typically between about 2.4 kV and about 33 kV, depending on the size of the area served by the distribution substation and the practices of the local utility company. Distribution line 140 may be implemented as an overhead line, e.g., as indicated in FIG. 1. Alternatively, distribution line 140 may be implemented as an underground line (not shown). Distribution line 140 terminates at a distribution transformer 150.

Distribution transformer 150 is typically located in close proximity to a user premises 160 and is configured to step-down the voltage from that of distribution line 140 to that used in user premises 160, e.g., 110-120 V or 220-240 V. The supply voltage generated by distribution transformer 150 is appropriately fed into user premises 160, e.g., to power a user-premises area network (UPAN) therein, a representative embodiment of which is described in more detail below in reference to FIG. 2. In some embodiments, distribution transformer 150 may also be designed to operate as a collector substation that collects, for further utilization in the electricity grid, the electrical power generated by small-scale power-generating equipment (if any) located at user premises 160. In a representative embodiment, the power-generating equipment located at user premises 160 may include a roof-mounted panel 164 of photovoltaic cells and/or a wind turbine 168, e.g., as indicated in FIG. 1. In addition to or instead of being collected by the collector substation, at least part of the energy generated by panel 164 and turbine 168 may be consumed on-site or stored in an energy-storage system 172, e.g., comprising a bank of rechargeable batteries and/or electrolytic fuel cells.

Also shown in FIG. 1, as part of the equipment located at user premises 160, is an electric-vehicle (EV) charging station 176. In various configurations, EV charging station 176 can draw energy from distribution line 140 or energy-storage system 172, or both.

Figure 2:
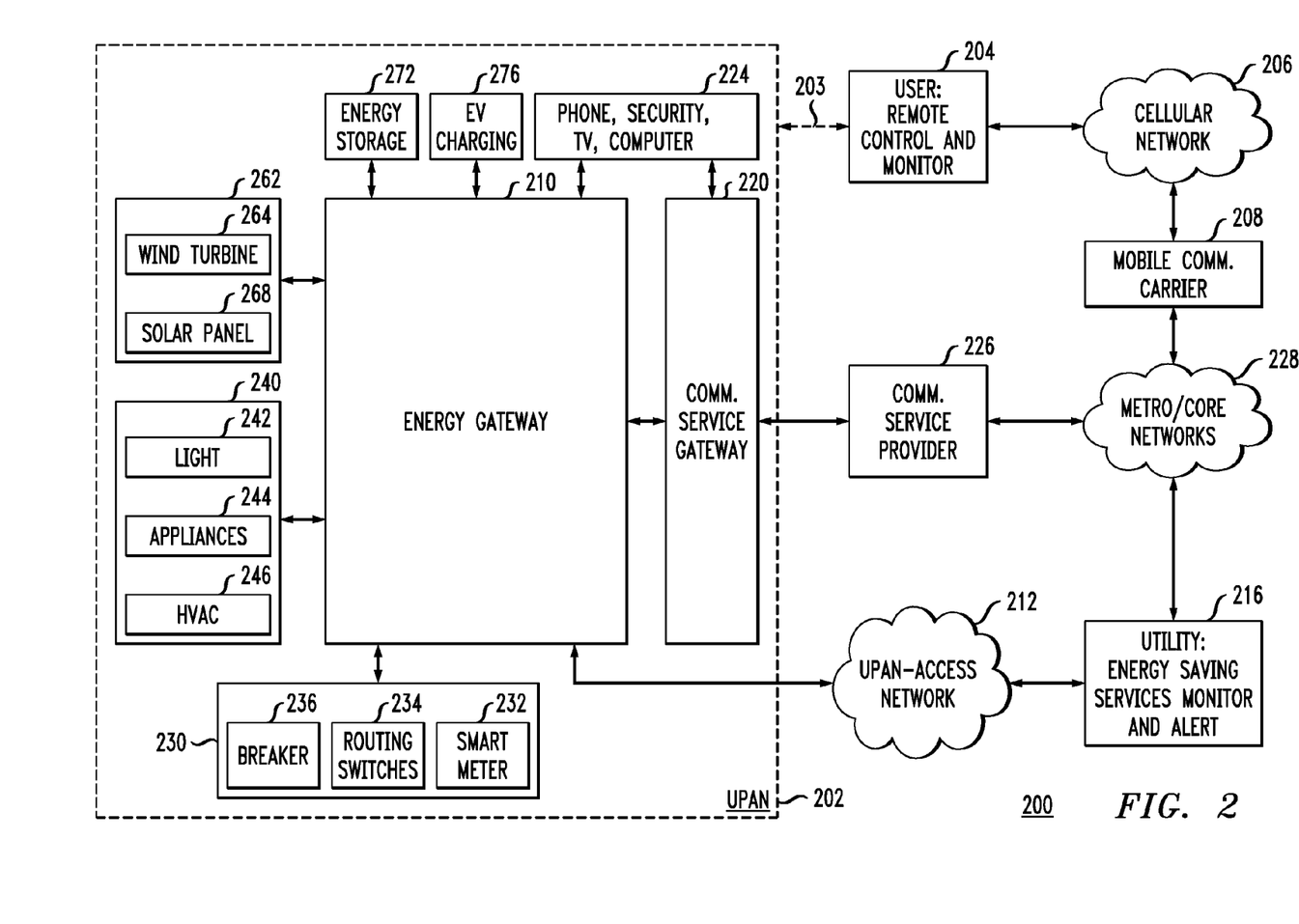
FIG. 2 shows a block diagram of a communication system that can be used to enable certain functions of the power-supply system shown in FIG. 1 according to one embodiment.

FIG. 2 shows a block diagram of a communication system 200 that can be used to enable various control functions of a user-premises area network (UPAN) 202 according to one embodiment of the disclosure. Note that FIG. 2 shows only communication/control links between the various components of system 200, without explicitly showing the electrical infrastructure that feeds externally generated electrical power into UPAN 202 or the electrical-power infrastructure of the UPAN itself. As already indicated above, in a representative configuration, UPAN 202 may be deployed at user premises 160 and connected to the electricity grid as described above in reference to FIG. 1. In different embodiments, the various communication links within UPAN 202 may be based on any suitable technology or standard, such as, without limitation, IEEE 802.3 Ethernet; IEEE 802.11 Wi-Fi; IEEE 1901 broadband over power-line networks; HomePNA broadband over telephone wires and coaxial cables; ITU G.hn networking over power lines, telephone wires, and coaxial cables; ZigBee wireless for low-power and low-data-rate communications; Bluetooth; and ISA100.11a.

UPAN 202 includes a UPAN-energy gateway 210 and a communication-services gateway 220 connected to one another and to the components of system 200 that are external to UPAN 202 as indicated in FIG. 2. As used herein, the term "gateway" refers generally to a means for interfacing two dissimilar networks. Such means can be implemented as a standalone device or be integrated into one or more host objects within UPAN 202.

UPAN-energy gateway 210 is an interface between the utility-controlled smart electricity grid and the energy-consuming/generating objects of UPAN 202. In a representative configuration, UPAN-energy gateway 210 communicates with a back office 216 of the utility company via an access network 212. In one embodiment, access network 212 is a private communication network that is used by the utility company to program and gather data from customers' smart meters, such as a smart meter 232 in UPAN 202. In an alternative embodiment, access network 212 may comprise a plurality of relay nodes connected to one another via power-line links, radio links, and/or links enabled by various public carriers or networks.

Communication-services gateway 220 is an interface between a central office 226 of a communication-services provider and the multimedia, security, and communication equipment 224 in UPAN 202. In various embodiments, central office 226 can be operated by (i) an Internet-service provider, (ii) a cable company, (iii) a telephone company, and/or (iv) a security company. Depending on the type of physical link between central office 226 and communication-services gateway 220, the latter may include one or more of a DSL modem, a cable modem, a signal-converter box, and an optical network unit. Equipment 224 may include, without limitation, one or more of a local area network (LAN), a computer, a printer, a scanner, a video camera, a TV set, a digital video recorder, a phone set, a fax machine, and a game console. In operation, communication-services gateway 220 and central office 226 enable equipment 224 to access the Internet, the public switched telephone network (PSTN), various content providers, and other metro/core networks, all of which are collectively shown in FIG. 2 under the reference numeral 228.

In a representative embodiment, UPAN-energy gateway 210 is configured to perform the following functions: (i) control activation/deactivation of various objects in UPAN 202; (ii) collect real-time energy-consumption/generation data from various objects in UPAN 202; (iii) control the electrical load of an energy-storage system 272 and small-scale power-generating equipment 262 (illustratively shown in FIG. 2 as comprising a wind turbine 264 and a solar panel 268); (iv) control the energy flow, through smart meter 232, between UPAN 202 and the electricity grid (also see FIG. 1); (v) provide feedback to back office 216 about power usage in UPAN 202; (vi) receive electricity-pricing signals from back office 216 for time-of-use management of the various objects in UPAN 202; and (vii) provide programmable control menus and remote-control capabilities to the user through an appropriate user interface, e.g., a handheld or stationary device 204.

A primary power sink 240 in UPAN 202 typically includes an indoor/outdoor lighting system 242, a plurality of appliances 244, and a heating/ventilation/air-conditioning (HVAC) system 246. Appliances 244 may include, without limitation, one or more of an electrical oven, a microwave oven, a dishwasher, a washing machine, a dryer, and a refrigerator. HVAC system 246 may include, without limitation, one or more of a water heater, a water circulation/filtration system, an area heater, an air-circulation/filtration system, an air conditioner, and a humidifier/dehumidifier. Additional power sinks in UPAN 202 may include an EV charging station 276 and the above-described equipment 224.

As used herein, the term "power sink object" refers to an electrical device or system that consumes electricity at rate that exceeds a specified threshold level. In various embodiments, the threshold level can be, e.g., 50 W, 100 W, or 1 kW. Other threshold levels are also contemplated.

In an exemplary configuration, upon reception of electricity-pricing information and power-availability messages from back office 216, UPAN-energy gateway 210 may selectively adjust power supply and energy consumption for the various power-sink objects in UPAN 202. For example, UPAN-energy gateway 210 may query energy-storage system 272 and power-generating equipment 262 about the availability of the electrical power stored/generated thereat. Based on the received response(s), UPAN-energy gateway 210 may configure a power-routing infrastructure 230 to appropriately route electrical power from power-generating equipment 262 and energy-storage system 272 to the various power-sink objects, while using the power drawn from the electricity grid as a supplement. Based on the user preferences and/or instructions, UPAN-energy gateway 210 may also send postponement/rescheduling/cancellation messages to at least some of the power-sink objects.

For example, the user might be sensitive to the cost of electricity but indifferent to when the dishwasher or clothes dryer runs, as long as the corresponding task is completed by the designated time. Based on these user preferences, UPAN-energy gateway 210 may appropriately configure power-routing switches 234 and/or circuit breakers 236 in power-routing infrastructure 230 to select the power source(s) and schedule the ON/OFF time(s) for the dishwasher or clothes dryer so as to minimize the cost of the task to the user. As another example, in the event of a shortage of power supply and/or a temporary price spike, UPAN-energy gateway 210 may immediately configure circuit breakers 236 to cut off power for EV-charging station 276.

As already indicated above, system 200 provides the user with the ability to remotely access, monitor, and control UPAN 202, at any time, via device 204, which can be a smart phone, a tablet, or a computer. This feature of system 200 is compatible with the strong preference by consumers to utilize a single smart device for all their communication needs/applications, such as voice, texting, email, and entertainment, which are now being expanded to include home security and energy management. As an example, FIG. 2 shows an embodiment in which device 204 is a smart phone that can access control functions of UPAN-energy gateway 210 via several different paths.

For example, one possible path can go from device 204 to UPAN-energy gateway 210 via a cellular network 206, a mobile switching center 208, and metro/core networks 228. Then, depending on the configuration of and/or user preferences for UPAN 202, metro/core networks 228 may be used to route the signals to/from home-energy gateway 210 through (i) central office 226 of the communication-service provider and communication-services gateway 220 or (ii) back office 216 of the utility company and access network 212. In either scenario, device 204 may be configured to communicate with UPAN-energy gateway 210, in a bidirectional manner, by running an appropriate application. Note that two different respective applications may be required for device 204 to connect with UPAN-energy gateway 210 via access network 212 and via communication-services gateway 220.

When device 204 is a tablet or a laptop computer, device 204 can be configured to access metro/core networks 228 via any suitable channel, such as a Wi-Fi access point, a 3G or 4G modem, or a wire-line Ethernet connection. In various alternative embodiments, other suitable network-access techniques may similarly be used to enable device 204 to access UPAN-energy gateway 210 via metro/core networks 228.

Another exemplary communication path between device 204 and UPAN-energy gateway 210 may include a short-range link 203, e.g., enabled by the Bluetooth or IEEE 802.11 technology. To establish link 203, device 204 needs to be located in relatively close proximity to a corresponding access point (not explicitly shown in FIG. 2) in UPAN 202. In various embodiments, the access point can be (i) integrated into UPAN-energy gateway 210, (ii) integrated into any other component (e.g., shown in FIG. 2) of UPAN 202 that is connected to the UPAN-energy gateway, or (iii) a stand-alone device connected to the UPAN-energy gateway.

Figure 3:
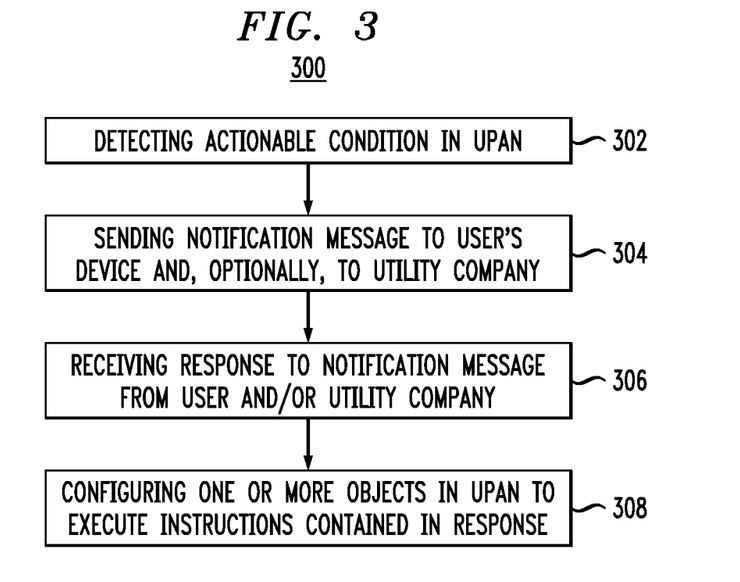
FIG. 3 shows a flowchart of a method of operating a user-premises area network (UPAN) that can be used in the system shown in FIG. 2 according to one embodiment.

FIG. 3 shows a flowchart of a method 300 of operating UPAN 202 according to one embodiment of the disclosure. Method 300 is described below in reference to FIGS. 1-3.

At step 302 of method 300, UPAN-energy gateway 210 detects an actionable condition in UPAN 202. In a representative configuration, UPAN-energy gateway 210 has a list of actionable conditions, some entries of which may be preprogrammed by the manufacturer and some entries of which may be generated by the user after UPAN 202 has been deployed at the user premises (e.g., premises 160 shown in FIG. 1). Representative actionable conditions may include, but are not limited to: (i) a failure condition; (ii) a service requirement; (iii) a hazard signal; (iv) an object activation/deactivation request; and (v) a schedule- or configuration-modification requirement.

A failure condition is a condition that may be associated with (i) a failure to perform or complete a scheduled or required task at any of the individual objects in UPAN 202 or (ii) a critical malfunction or physical breakdown of any component of UPAN 202.

A service requirement is a condition that may be associated with (i) scheduled maintenance for any of the individual objects in UPAN 202 or (ii) non-optimal operation or configuration of any component of UPAN 202.

A hazard signal is a condition that may be associated with a fire alarm, a smoke-detector alarm, a dangerous-weather alert, a flood warning, etc.

An object activation/deactivation request is a condition that requires a particular object in UPAN 202 to be turned ON or OFF.

A schedule- or configuration-modification requirement is a condition that may be associated with a conflict between two or more objects in UPAN 202, e.g., for the supply of power from a particular source, such as wind turbine 264, solar panel 268, energy storage 272, or the electricity grid.

At step 304, UPAN-energy gateway 210 sends a notification message to device 204 to inform the user that an actionable condition has been detected in UPAN 202. Depending on the configuration of UPAN 202, physical location of device 204, and user preferences, the notification message can be directed to device 204 (i) via short-range link 203, (ii) via communication-services gateway 220 and central office 226 of the communication-service provider, or (iii) via UPAN-access network 212 and back office 216 of the utility company.

Note that the user may have more than one device configured to operate as device 204. In that case, UPAN-energy gateway 210 may send a copy of the notification message to each or any specified subset of said devices. Furthermore, UPAN-energy gateway 210 may be configured to use additional communication channels, such as voice, SMS, email, etc., to notify the user about the actionable condition.

In one configuration, UPAN-energy gateway 210 may also send a copy of the notification message to an appropriate agent at the utility company. Depending on the circumstances and/or the operating procedures at the utility company, said agent may be an automated agent or a live operator.

At step 306, UPAN-energy gateway 210 receives a response to the notification message sent out at step 304 with instructions for resolving the actionable condition detected at step 302. The response may come from (i) the user via device 204 or through any other authenticated channel or (ii) from an appropriate agent at the utility company, or both.

Upon receipt of the notification message, the user may generate an appropriate response, e.g., by accessing, via device 204 or through any other authenticated channel, the programmable control menus and/or control functions in UPAN-energy gateway 210. Alternatively or in addition, the user may contact the utility company for assistance in generating an appropriate response to the notification message. In the latter scenario, an appropriate agent at the utility company may generate a response and send it to UPAN-energy gateway 210, e.g., via back office 216 and access network 212.

When appropriate or authorized, the utility company may also generate a response to the notification message without an explicit request from or involvement of the user, provided that UPAN-energy gateway 210 had sent a copy of the notification message to the utility company at step 304 and the user had previously authorized or given consent to the utility company to act on behalf of the user.

Depending on the nature of the notification message, the response received by UPAN-energy gateway 210 may include, without limitation, one or more of the following: (i) a power shutdown or turn-OFF command for some or all objects in UPAN 202; (ii) a turn-ON command for some or all objects in UPAN 202; (iii) a reconfiguration instruction for power-routing infrastructure 230; (iv) a rescheduling instruction with regard to one or more tasks for one or more objects in UPAN 202; (v) acknowledgment of receipt; and (vi) a hold, disregard, or overrule instruction.

At step 308, UPAN-energy gateway 210 configures one or more of the objects in UPAN 202 implicated in the response received at step 306 to execute the instructions contained in the response.

Figure 4:
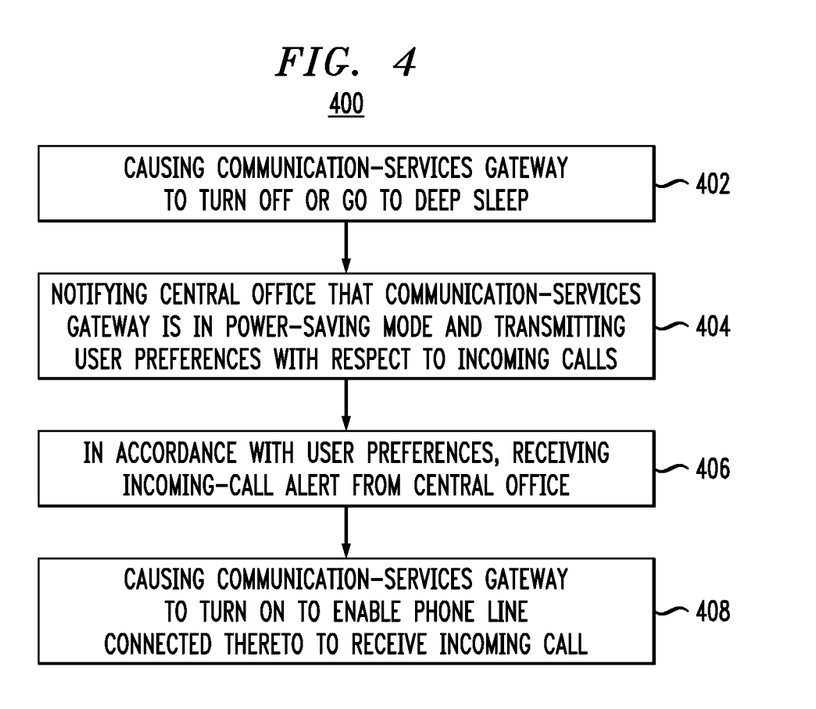
FIG. 4 shows a flowchart of a method of operating a UPAN that can be used in the system shown in FIG. 2 according to another embodiment.

FIG. 4 shows a flowchart of a method 400 of operating UPAN 202 according to another embodiment of the disclosure. Method 400 is described below in reference to both FIGS. 2 and 4.

Method 400 is directed at addressing a problem with the energy efficiency of the equipment that enables bundled communication services, such as TV, telephone, and the Internet. More specifically, a provider of bundled communication services usually furnishes to the subscriber a single converter box that enables the subscriber to receive all of the bundled communication services. When deployed at the subscriber's premises, the converter box implements communication-services gateway 220.

One problem with converter boxes is that they have become one of the largest electricity sinks in many American homes, with some converter-box configurations consuming more power than a typical refrigerator and, sometimes, more than a small air-conditioner. A primary reason for this relatively high power consumption is that a converter box is usually configured to run nonstop twenty four hours a day, even when not in active use. A recent study by the Natural Resources Defense Council has concluded that converter boxes consume about $3 billion in electricity per year in the United States alone and that two thirds of this power is wasted when no one is watching TV, using the phone, or surfing the Internet. Method 400 at least partially addresses this problem by enabling an activation of the converter box (communication-services gateway 220) from the OFF or deep-sleep state on demand, e.g., when an incoming phone call needs to be received on the telephone line or interface connected to the converter box.

At step 402 of method 400, UPAN-energy gateway 210 is configured to cause communication-services gateway 220 to turn OFF or go to deep sleep, e.g., if none of its functionalities corresponding to the bundled services have been requested for a specified length of time or if requested by the user by accessing UPAN-energy gateway 210 via device 204. As used herein, the term "deep sleep" refers to an operating mode in which power consumption does not exceed a specified relatively low level, e.g., 5% of the nominal full-ON power consumption. As already indicate above, the user can appropriately configure UPAN-energy gateway 210, e.g., using device 204.

At step 404, UPAN-energy gateway 210 notifies central office 226 that communication-services gateway 220 is being operated in a power-saving mode and, as such may be turned OFF. Together with the notification, UPAN-energy gateway 210 also specifies user preferences with regard to incoming phone calls. For example, in one configuration, the user might prefer that communication-services gateway 220 be not turned ON to receive an incoming phone call and that the phone call be forwarded to an alternative number, e.g., that associated with device 204 (when device 204 is a smart phone). In another configuration, the user might prefer that communication-services gateway 220 be turned ON to enable the telephone line or interface connected thereto to receive an incoming phone call in a conventional manner. Note that the user preferences may depend on the caller ID of the incoming phone call.

If communication-services gateway 220 is still in the ON state, then UPAN-energy gateway 210 may perform step 404 by sending a corresponding message to central office 226 directly through communication-services gateway 220. If communication-services gateway 220 is in the OFF state, then UPAN-energy gateway 210 may perform step 404 by sending a corresponding message to central office 226 via access network 212, back office 216, and metro/core networks 228. The latter message-transmission path can also be used as an alternative transmission path when communication-services gateway 220 is in the ON state. When communication-services gateway 220 is in the OFF state but device 204 is located in close proximity to UPAN 202, UPAN-energy gateway 210 may also perform step 404 by sending a corresponding message to central office 226 via short-range link 203, device 204, cellular network 206, mobile switching center 208, and metro/core networks 228.

At step 406, communication-services gateway 220 is in the OFF or deep-sleep state, e.g., due to the inactivity timer running out. If an incoming phone call intended for the telephone line or interface connected to communication-services gateway 220 arrives at central office 226, then the central office first verifies that the communication-services gateway operates in the power-saving mode and then checks the user preferences specified at step 404. If the user prefers that the call be forwarded to an alternative number, then central office 226 does that. If the user prefers that the call be received on the telephone line or interface as dialed, then central office 226 sends an incoming-call alert to UPAN-energy gateway 210. In one configuration, UPAN-energy gateway 210 can receive this alert, e.g., via a transmission path that includes metro/core networks 228, back office 216, and access network 212. In another configuration, when device 204 is located in close proximity to UPAN 202, UPAN-energy gateway 210 can receive this alert, e.g., via a transmission path that includes metro/core networks 228, mobile switching center 208, cellular network 206, device 204, and short-range link 203.

At step 408, upon receiving the incoming-call alert from central office 226, UPAN-energy gateway 210 causes communication-services gateway 220 to turn ON. After communication-services gateway 220 is turned ON and is online, the incoming phone call can be received, as intended by the caller, on the telephone line or interface connected to the communication-services gateway.

While this invention has been described with reference to illustrative embodiments, this description is not intended to be construed in a limiting sense.

Although some embodiments disclosed herein have been described in reference to "a home," non-residential applications of "energy gateways" are also contemplated and fall within the claimed subject matter. Accordingly, the terms "UPAN energy gateway" and "user-premises area network" should not be construed as being limited to a residential dwelling only, but should be interpreted to also cover the corresponding components of an energy-management system deployed at any premises, residential or not.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. An apparatus comprising an energy gateway device configured to control energy consumption in a user-premises area network by causing at least some objects of the user-premises area network to turn ON and OFF, said at least some objects including a communication-services gateway device coupled between a telephone interface and a communication-services provider, wherein the energy gateway device is configured to:
   receive, from the communication-services provider, via a first communication path that does not include the communication-services gateway device, an alert about an incoming call to said telephone interface; and
   cause, in response to the alert, the communication-services gateway device to turn ON to enable said telephone interface to receive the incoming call.

2. The apparatus of claim 1, further comprising the communication-services gateway device, wherein the communication-services gateway device is further configured to provide, via the communication-services provider, at least one of a TV service and an Internet-access service for the user-premises area network.

3. The apparatus of claim 1, wherein:
   the energy gateway device is connectable, via a wireless link, to a mobile user device; and
   the first communication path includes the wireless link and the mobile user device.

4. The apparatus of claim 3, wherein the wireless link is configured to operate in accordance with a Bluetooth standard.

5. The apparatus of claim 1, wherein the energy gateway device is configured to communicate with the communication-services provider via at least two different routes that do not include the communication-services gateway device, wherein:
   the energy gateway device is connectable, via a wireless link, to a mobile user device;
   a first of said at least two different routes includes a path through an access network of a utility company that operates an electricity grid connected to the user-premises area network;
   a second of said at least two different routes includes the wireless link and the mobile user device; and
   the first communication path is a selected one of the first and second of said at least two different routes.

6. The apparatus of claim 1, wherein the energy gateway device is configured to receive said alert via the first communication path when the communication-services gateway device is turned OFF or is in a sleep mode.

7. The apparatus of claim 1, wherein the energy gateway device is configured to receive the alert via the first communication path that includes a path through an access network of a utility company that operates an external electricity grid connected to the user-premises area network.

8. The apparatus of claim 7, wherein the energy gateway device is configured to control said energy consumption in the user-premises area network based on received instructions, wherein at least one of the received instructions originates at a mobile user device configurable to access the energy gateway device via said access network.

9. The apparatus of claim 8, wherein the mobile user device is a smart wireless phone configured to run an application for accessing the energy gateway device via the access network.

10. The apparatus of claim 7, wherein the energy gateway device is configured to control said energy consumption based on received instructions, wherein at least one of the received instructions originates from the utility company.

11. The apparatus of claim 1, wherein the energy gateway device is configured to:
   send a first notification message to a mobile user device in response to an actionable condition detected in the user-premises area network; and
   send a second notification message to the utility company in response to said actionable condition, wherein the actionable condition belongs to a set consisting of: (i) a failure condition; (ii) a service requirement; (iii) a hazard signal; (iv) a schedule-modification requirement; and (v) a configuration-modification requirement.

12. The apparatus of claim 1, wherein the energy gateway device is configured to turn OFF the communication-services gateway device when one or more communication services provided via the communication-services gateway device have not been requested for a specified length of time or based on a user instruction.

13. The apparatus of claim 12, wherein the energy gateway device is further configured to notify the communication-services provider when the communication-services gateway device is to be turned OFF.

14. The apparatus of claim 1, wherein:
   the user-premises area network comprises one or more power-sink objects; and the energy gateway device is configured to individually control activation and deactivation of at least some of said one or more power-sink objects.

15. The apparatus of claim 14, wherein the energy gateway device is configured to individually control said activation and deactivation based on at least one of: (i) an electricity-pricing signal received from a utility company and (ii) a user instruction.

16. The apparatus of claim 14, wherein the energy gateway device is configured to:
query power-generating equipment and energy storage about the availability of electrical power stored or generated at the user-premises area network; and
based on a response to the query, route electrical power from the power-generating equipment and the energy-storage system to the one or more power-sink objects.

17. The apparatus of claim 1, wherein the apparatus includes the user-premises area network, wherein the user-premises area network comprises one or more of: a lighting system, one or more appliances, a heating system, a ventilation system, an air-conditioning system, an electric-vehicle charging system, communication equipment, multimedia equipment, a solar panel, a wind turbine, an energy storage, and a power-routing infrastructure.

18. The apparatus of claim 1, wherein the energy gateway device configured to control the energy consumption by performing one or more of the following:
control activation or deactivation of objects of the user-premises area network;
collect real-time energy-consumption or generation data from the objects of the user-premises area network;
control electrical load of an energy-storage system or power-generating equipment of the user-premises area network;
control energy flow, through a smart meter, between the user-premises area network and an external electricity grid;
provide feedback to a back office of a utility company that operates the external electricity grid about power usage in the user-premises area network;
receive electricity-pricing signals from the back office for time-of-use management of the objects of the user-premises area network; and
provide programmable control menus and remote-control capabilities to a user interface of a mobile or stationary communication device.

19. An apparatus comprising equipment for a communication-services provider configured to provide a telephone service for a telephone line served by said equipment through a communication-services gateway device, said communication-services gateway device being a component of a user-premises area network, wherein the user-premises area network comprises an energy gateway device adapted to control energy consumption in said user-premises area network by causing at least some objects of the user-premises area network to turn ON and OFF, wherein said equipment is configured to:
receive, from the energy gateway device, a notification when the communication-services gateway device is to be turned OFF; and
send, to the energy gateway device, via a first communication path that does not include the communication-services gateway device, an alert about an incoming call for said telephone line to cause the communication-services gateway device to be turned ON and enable said telephone line to receive the incoming call via the communication-services gateway device.

20. The apparatus of claim 19, wherein the first communication path includes a path through an access network of a utility company that operates an external electricity grid connected to the user-premises area network.

21. The apparatus of claim 19, wherein the first communication path includes a mobile user device and a wireless link between the mobile user device and the user-premises area network.

* * * * *